United States Patent Office

3,477,802
Patented Nov. 11, 1969

3,477,802
MODIFICATION OF CELLULOSE, POLYVINYL ALCOHOL AND STARCH WITH COMPOUNDS CHARACTERIZED BY ETHYLENE RADICALS HAVING AN ELECTRON ATTRACTING GROUP WHICH STABILIZES CARBANIONS ON ONE CARBON ATOM THEREOF AND AN ALKOXY OR HYDROXY GROUP ON THE OTHER
Giuliana C. Tesoro, Dobbs Ferry, N.Y., assignor to J. P. Stevens & Co., Inc., New York, N.Y., a corporation of Delaware
No Drawing. Filed Mar. 19, 1963, Ser. No. 266,167
Int. Cl. D06m 1/06
U.S. Cl. 8—115.5      25 Claims This invention broadly relates to modified polymers and the process for making the same, and, more particularly, relates to a process for modifying polymers containing active hydrogen atoms, whereby desirable properties are imparted to the polymers. Specifically, the invention relates to the modification of polymers containing active hydrogen atoms by introducing into the polymer molecules certain substituent groupings which impart the aforesaid desirable properties to the polymers.

This application is a continuation in part of my co-pending application Ser. No. 190,246, filed on Apr. 26, 1962.

While unmodified polymers, including natural polymers, have been widely used in many fields including the textile, textile finishing, chemical, and other fields, there has developed a need during the last several years for polymers, both natural and synthetic, which are modified in such a way as to make them more suitable for many diverse functions and applications where the use of the unmodified polymers has proven unsatisfactory.

Polymers are modified when they contain specific substituent groupings in the molecule, which groupings are responsible for imparting the desired properties to the polymers. Many polymeric materials can be synthesized by carrying out the polymerization reactions with suitable monomers or monomer mixtures. If one of the monomers contains a substituent grouping, it is possible to introduce this grouping into the polymer formed during the polymerization reaction. However, the presence of substituent groupings in monomers frequently alters their polymerization behavior, thereby affecting the structure of the resulting polymer.

Since many polymeric materials occur in nature, it is desirable to modify polymeric materials by directly introducing the substituent grouping into a polymer by reacting the polymer with a monofunctional or a polyfunctional organic compound containing the desired grouping. In this manner, one can exercise better control over the reaction and consequently can more readily obtain the desired properties in the final product.

As example of chemical modification of polymeric materials is found in the treating of naturally occurring polymers, such as cellulosic materials, with organic compounds in order to impart specific desirable properties to the polymers by a chemical reaction therewith. Methods for enhancing the dimensional stability of natural fibers, for modifying the solubility properties of synthetic and naturally occurring polymers, for enhancing the dye affinity of hydrophobic polymers, and like methods, are based on the chemical modification of the polymer molecules, and these methods have many important applications in industry.

A known method for modifying polymers is the reaction of polymers containing active hydrogen atoms with certain activated olefinic compounds, which reaction can be represented by the following equation:

(1) 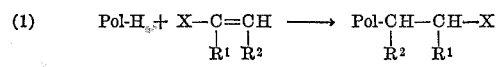

wherein $R^1$ is a member of the group consisting of hydrogen and lower alkyl, $R^2$ is a member of the group consisting of hydrogen, lower alkyl and X, and X is an activating group.

The symbol Pol-H is used to designate a polymeric molecule having a plurality of active hydrogen atoms, including those which may be present in hydroxyl groups, amino groups, amide groups, and the like. An "active hydrogen atom," as this term is to be understood in the present disclosure, is "a hydrogen atom so situated in a covalent molecule that it may easily separate as a proton," (E. E. Royals, Advanced Organic Chemistry, Prentiss-Hall (1954), page 731).

An "activating group," as this term is to be understod in the present disclosure, is "an electron attracting group which stabilizes carbanions," (Hine, Physical Organic Chemistry, McGraw-Hill (1945), page 223). Activating groups which are linked to the remainder of the molecule by means of carbon-carbon and carbon-nitrogen bonds are of particular interest, and include carbonyl (—CO—), cyano (—CN), nitro (—NO$_2$), trifluoromethyl (—CF$_3$), difluoromethylene (—CF$_2$—), and the like.

The known reaction of the aforesaid activated olefins with polymers containing active hydrogen atoms has certain disadvantages which make it unsuitable for most commercial operations. The activated olefins are generally toxic compounds and often exhibit lachrymatory and vesicant properties which severely limit their commercial usefulness. In handling these compounds, extreme caution must be exercised and it is necessary to provide a completely closed system when working therewith in order to avoid severe hazards to personnel in attendance. Use of closed systems in commercial operations is naturally more costly since it is necessary to provide expensive equipment for preventing the escape of toxic vapors. Furthermore, many textile finishing operations involve processing of fibers, yarns and fabrics in open equipment wherein a vast surface of the textile is by necessity exposed to the atmosphere during processing. Hence, use of closed systems in these operations is impractical.

Furthermore, activated olefins are, in general, relatively volatile compounds. While losses through evaporation can be controlled by the use of reflux condensers and closed systems in the case of bulk reactions, this clearly cannot be accomplished in a practical manner when the reaction is carried out on textile materials in open equipment.

Another disadvantage is that, in most instances, the solubility of the activated olefins in water is very low. Since water is an inexpensive and highly desirable reaction medium for the modification of polymers, and particularly of textiles, compounds of limited water solubility are not suitable as reagents for the chemical modification of fibers.

A further disadvantage is that the activated olefins often exhibit a strong tendency for polymerization and self-condensation. Thus, their reaction with the active hydrogen atoms of the polymers is accompanied by the formation of homo-polymers and graft polymers. These by-products are difficult to remove and often impair the properties of the modified polymers.

In many instances, the lack of solubility and/or the volatility of the reagents make it impossible to maintain suitable control of the reaction or to obtain reproducible results. Therefore, it is not surprising that even those activated olefinic compounds which are commercially available at moderate cost and which have been claimed to be useful reactants for the chemical modification of polymers, have not been widely used on a commercial scale and have found only very limited acceptance, particularly in the field of textiles, which includes the processing of fibers, yarns and fabrics, where the use of non-aqueous solutions and closed systems is neither common nor practical.

Accordingly, it is an object of the present invention to provide a process for chemically modifying polymers containing active hydrogen atoms, which process obviates many of the aforesaid disadvantages and limitations.

It is another object of this invention to provide a process for modifying polymers containing active hydrogen atoms by introducing specific substituent groupings into the polymers, thereby imparting certain desired properties to the polymers.

A further object of this invention is to provide a process for modifying cellulosic material, including fibers, yarns, fabrics, textiles and the like, whereby desired properties such as improved wet and dry crease recovery, dimensional stability, resistance to shrinkage during laundering, improved resistance to degradation by heat, and other properties may be imparted to the cellulosic materials.

Still another object of this invention is to provide a process for modifying polymeric materials having active hydrogen atoms whereby desired properties are imparted to the materials, including modified solubility characteristics of certain polymers, reduced tendency of some polymers to swell in water, and other desired properties.

Another object of this invention is to provide chemically modified polymers having specific substituents thereon which give the polymers the properties necessary to make the polymers suitable for particular purposes.

Still a further object is to provide cellulosic textile materials having improved properties such as wet and dry crease recovery, improved resistance to heat degradation, reduced tendency to shrinkage on laundering, improved dimensional stability, reduced losses in tensile and tear strengths, reduced losses in abrasion resistance and the like.

In attaining the objects of this invention, one feature resides in reacting a polymer having active hydrogen atoms with an organic compound which is water-soluble, non-toxic, stable, has low volatility and no tendency to polymerize, hydrolyze, or decompose during storage either in bulk or in aqueous or solvent solution, and which can react under mild conditions of catalysis, whereby the organic compound forms a substituent on the polymer, and modifies the properties of the polymer.

Another feature resides in treating polymeric materials having active hydrogen atoms, such as cellulosic fibers, yarns, fabrics, textiles and the like, starch, polyvinyl alcohol, etc., with a particular saturated beta oxyethyl derivative of an activated olefinic compound in order to impart the desired properties to the polymeric material by modification and crosslinking of the molecules of the material.

Other objects, features, and advantages will be apparent from the following description of the invention.

It has now been discovered that desired characteristics may be imparted to polymeric materials having active hydrogen atoms by reacting such materials with saturated beta oxyethyl derivatives of activated olefinic compounds wherein the compounds contain at least one activating group in a position beta to an ether or a hydroxyl oxygen atom, and the activating group is linked to the remainder of the molecule by a carbon-carbon or a carbon-nitrogen bond. Compounds falling within the scope of the invention include organic compounds containing at least one grouping of the formula

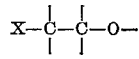

or

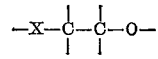

More specifically, monofunctional compounds coming within the scope of the invention include those having the formula:

(I) 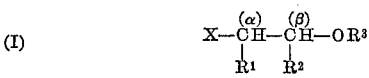

wherein $R^1$ and $R^3$ are members of the group consisting of hydrogen and lower alkyl, $R^2$ is a member selected from the group consisting of hydrogen, lower alkyl, substituted lower alkyl, and X, and X is an activating group as described supra. Specific examples of radicals which are included in the definition of X are —CN, —CONH$_2$, —COHNCH$_3$, —COCH$_3$, —CHO, —NO$_2$, —CF$_2$

and the like. However, it is to be understood that X includes the following radicals: —CONR$^4$R$^5$, COR$^6$ and COOR$^7$ wherein $R^4$ and $R^5$ are hydrogen and lower alkyl radicals, $R^6$ is an inert organic radical and included within this definition are the aliphatic, aromatic, and alkylaromatic radicals such as alkyls and particularly lower alkyls; aryls, such as benzyl, phenyl and the like; cycloalkyls, and other like radicals which will not react when present in the monofunctional compound of Formula I, and $R^7$ is a lower alkyl radical.

The reaction proceeds at an elevated temperature, in the presence of from catalytic to stoichiometric amounts of an alkaline catalyst in accordance with the equation (II)

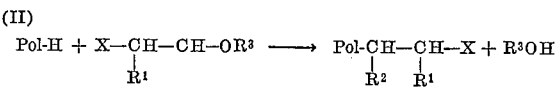

The by-product, whether it be water or alcohol, is eliminated from the system.

Unlike activated olefins which have previously been used in chemical modification reactions with polymers having active hydrogen atoms, the beta oxyethyl derivatives of activated olefinic compounds which are contemplated in the present invention are generally soluble, non-toxic, stable compounds of low vapor pressure, which have no tendecy to polymerize, hydrolyze, or decompose during storage in bulk, or in aqueous or solvent solutions. The discovery that these compounds can be reacted with polymers under mild conditions of catalysis opens a vast number of possibilities for chemical modifications of polymers which has not been feasible heretofore due to the limitations of previously known reactants and processes.

Among the many compounds coming within the scope of Formula I and which may be employed as reagents in the new processes of the present invention are the following:

(II-C)   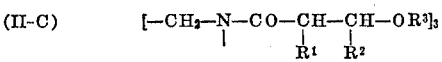

and the unsatisfied valences are satisfied in the cycliza-

TABLE I

| Compound | (α) R¹ | (β) R² | R³ | X | Type |
|---|---|---|---|---|---|
| (1) HOCH₂CH₂CN | H | H | H | CN | Nitrile. |
| (2) CH₃OCH₂CH₂CN | H | H | CH₃ | CN | Do. |
| (3) C₂H₅OCH₂CHCN<br>    \|<br>    CH₃ | CH₃ | H | C₂H₅ | CN | Do. |
| (4) CN—CH₂CH—CH₂CN<br>         \|<br>         OH | H | CNCH₂ | H | CN | Do. |
| (5) CN—CH₂CH₂CH₂CN<br>         \|<br>         OCH₃ | H | CNCH₂ | CH₃ | CN | Do. |
| (6) ClCH₂CHCH₂CN<br>        \|<br>        OH | H | ClCH₂ | H | CN | Do. |
| (7) CH₃OCH₂CH₂CONH₂ | H | H | CH₃ | CONH₂ | Amide. |
| (8) C₄H₉OCH₂CHCONH₂<br>         \|<br>         CH₃ | CH₃ | H | C₄H₉ | CONH₂ | Do. |
| (9) HOCH₂CH₂CONHCH₃ | H | H | H | CONHCH₃ | Do. |
| (10) CH₃OCH₂CH₂COCH₃ | H | H | CH₃ | COCH₃ | Ketone. |
| (11) C₂H₅OCH₂CH₂CHO | H | H | C₂H₅ | CHO | Aldehyde. |
| (12) C₂H₅OCH₂CH₂NO₂ | H | H | C₂H₅ | NO₂ | Nitro compound. |
| (13) CH₃OCH₂CH₂CF₃ | H | H | CH₃ | CF₃ | Trifluoromethyl compound. |
| (14) HOCH₂CH₂COOCH₃ | H | H | H | COOCH₃ | Ester. |

While examples of compounds where R² is a cyano- and a halogen-substituted alkyl group are set forth in the above table, other substituents may be on the alkyl group and the compounds will perform satisfactorily for the purposes of this invention, provided the substituent is free of active hydrogen atoms. Whenever the term "lower alkyl" is used in this specification, it refers to an alkyl having from 1 to 6 carbon atoms, although it is preferable to have from 1 to 4 carbon atoms present in the group.

Besides the monofunctional reagents of Formula I, it has been found that reagents containing more than one beta oxyethyl grouping also impart highly desirable properties to polymeric materials containing active hydrogen atoms, particularly for crosslinking the polymers to form three-dimensional networks. Included among such polyfunctional reagents are those having the formula:

(II-A)   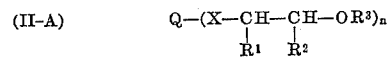

wherein Q is an organic radical, X, R¹, R², and R³ have the same defininition as in Formula I, and n is a whole number equal to the valence of Q. Included among the activating groups of Formula II-A are $$-CON\diagup, -CF_2-, -\overset{O}{\overset{\|}{C}}O-, CONH-$$

and the like.

A special case of the compounds of Formula II-A is that of s-perhydrotriazine derivatives, which are polyfunctional, and might be considered cyclic trimers of a compound of Formula II-A as explained below. For example, these compounds come within formula (II-B)   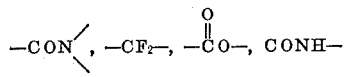

in which:

$Q=CH_2$
$X=CON<$
$n=1$

Accordingly, Formula II-B becomes:

tion reaction forming the s-perhydrotriazine derivative shown in Formula II-D in which the 3 elements represented by Formula II-C above are indicated by dotted lines.

(II-D)

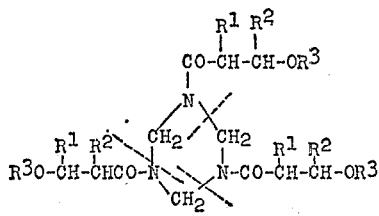

Compounds of the formula (III)   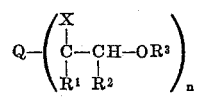

are also included wherein Q is an organic radical and R¹, R², R³ and X have the same definition as in Formula I.

Compounds coming within the formula (IV)   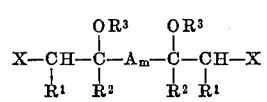

are satisfactory for purposes of the invention and R¹, R², R³ and X have the same definition as in Formula I, and A is a divalent organic radical, such as alkylene, preferably having from 1 to 6 carbon atoms, arylene, alkarylene, and the like, wherein m is either 0 or 1. However, R¹ may also be X in Formula IV.

Examples of compounds coming within the above formulae including the following:

TABLE II

| Compound | Functionality | Activating Group(s) | Type |
|---|---|---|---|
| (1) NO₂CH—CH₂CH₂—CHNO₂<br>     \|                \|<br>   CH₂OH     CH₂OH | 2 | —NO₂ | Nitro compound. |
| (2) NO₂CH₂—CH—CH—CH₂NO₂<br>           \|    \|<br>          OH  OH | 2 | —NO₂ | Do. |
| (3) CH₃OCH₂CH₂CONH\<br>                            CH₂<br>   CH₃OCH₂CH₂CONH/ | 2 | —CONH— | Amide. |
| (4) HOCH₂CH₂CONH(CH₂)₆—NHCONH₂CH₂OH | 2 | —CONH— | Do. |
| (5) C₂H₅OCH₂CH₂CON(CH₂—CH₂)NCOCH₂CH₂OC₂H₅ (piperazine ring) | 2 | —CON< | Do. |
| (6) CNCHCH₂CH₂CHCN<br>     \|           \|<br>   CH₂OH  CH₂OH | 2 | CN | Nitrile. |
| (7) CN\                  /CN<br>    CH—CH—CHCH<br>  CN/  OH  OH  \CN | 2 | CN | Do. |
| (8) CH₃OCH₂CH₂CO—N(CH₂/CH₂\N/CH₂\CH₂)N—COCH₂CH₂OCH₃<br>             COCH₂CH₂OCH₃ | 3 | —CON< | Amide. |
| (9) HOCH₂CH₂CON(CH₃ ring)N—COCH₂CH₂OH<br>          COCH₂CH₂OH | 3 | —CON | Do. |
| (10) CH₃OCH₂CH₂COCH₂COCH₂CH₂OCH₃ | 2 | —CO— | Ketone. |
| (11) HOCH₂CH₂CF₂CF₂CF₂CH₂CH₂OH | 2 | —CF₂— | Fluoro compound. |
| (12) C₂H₅OCH₂CH₂COOCH₂CH₂OCOCH₂CH₂OC₂H₅ | 2 | O<br>‖<br>—CO— | Ester. |

The difunctional compounds wherein Q is an aliphatic hydrocarbon, and particularly a lower alkylene group having from 1 to 6 carbon atoms, are among those preferred, since they have excellent solubility properties, although for puropses of this invention, higher alkylene groups will also perform satisfactorily.

Also preferred are the compounds wherein Q is part of a triazine radical. However, for the purposes of this invention, the structure of the radical Q is not critical, since the governing factor is the presence of at least one of the groups

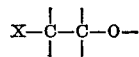

or

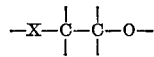

in the compound.

Among the polymers containing active hydrogen atoms suitable for use in the process of this invention are cellulose and cellulose derivatives, including natural cellulosic fibers such as cotton, wood, linen, paper, jute, hemp, sisal, and the like; regenerated cellulose, such as rayon, cellulose film and soluble cellulose products; starch; dextrin and other naturally occurring polysaccharides; partially and completely hydrolyzed polyvinyl alcohol; synthetic polyamides and polypeptides; naturally occurring polypetides, such as gelatin, wool, silk, and the like; synthetic polyamine products such as those obtained by polycondensation of polyfunctional monomeric amines with polyfunctional alkylating esters (halides, sulfates, and the like) or with polyepoxides; and many others. It is to be noted that in the foregoing polymers, the active hydrogen atoms are present in the hydroxyl, thiol, amide, or amino groups of the polymers.

The polymeric materials to be treated in accordance with the invention are reacted with a solution of the aforesaid saturated beta oxyethyl derivative of an activated olefinic compound, and an alkaline catalyst therefor, and then subjected to an elevated temperature for a period of time sufficient to drive the reaction to substantial completion. When the polymeric material is in the form of a fabric, the solution containing the aforesaid reactant and catalyst is applied to the fabric by impregnation, coating, dipping, spraying, or other suitable means. The fabric is then dried to remove the solvent and the dried fabric is subjected to a brief reaction period at an elevated temperature in order to drive the desired reaction to substantial completion. After heating by curing, baking, steaming or other suitable means, the fabric is washed to remove the catalyst and residual soluble materials.

While water is the preferred solvent, since it is inexpensive and readily available, organic solvents such as alcohols, ethers, ketones and hydrocarbons can also be used in the process of the invention. When the solvent is first removed in the drying step, and the reaction occurs after removal of the solvent, it is not necessary to select specific inert solvents for the purposes of the invention.

Alkaline catalysts which have been found to be effective for the process of the invention include hydroxides, carbonates, bicarbonates, phosphates and silicates of alkali metals, and quaternary ammonium hydroxides. Non-volatile organic bases of equivalent strength may also be employed, provided they are free of groups which would react with the reagent so as to destroy its capabilities. Because of their low cost and availability, the alkali hydroxides, carbonates and bicarbonates are the preferred catalysts. The amount of alkaline catalyst which is required depends on its basic strength, the preferred reaction conditions and the structure of the reagent. A more rapid rate of reaction can be achieved with higher concentrations and/or greater basicity of the catalyst. The concentration of alkaline catalysts used can be varied from about 0.2% to about 10%, based on the weight of the material treated. However, concentrations of about 1% to about 5% are generally preferred since they are sufficient to assure rapid reaction rates without damaging even the most alkali-sensitive active hydrogen-containing polymers.

Softeners, lubricants, stiffeners, and other conventional additives can be present in the treating solution employed, the only limitation being the chemical compatibility of the system under the conditions selected for reaction. Conventional finishing agents designed to impart other functional properties, for example, water repellency, can be applied in separate or simultaneous processes. Many common dyestuffs can also be incorporated in the treating solution and chemically bound to the polymer in the course of modification. With trifunctional compounds such as compounds 8 and 9 in TABLE II, the combined application to textiles of the reagent and dyestuffs, sizing compounds or other finishing agents offers some outstanding advantages. For example, two of the functional groups of the reagent can react with the active hydrogen in the textile, forming stable crosslinks while the third functional group reacts with the dye, sizing compound or other component present on the textile. By such means, outstanding combinations of desirable properties can be obtained in a single process.

The period of time necessary to drive the crosslinking reaction to substantial completion is not critical, and will depend on the concentration and the nature of the alkaline catalyst used, the particular reagent used, the temperature, and perhaps on other reaction conditions. Generally, at moderate temperatures and atmospheric pressure, reaction times of several minutes to several hours are effective, again depending upon the catalyst system and reagent employed. Generally, whenever higher concentrations of alkaline catalysts are employed, the period of reaction is shorter. Thus, reaction time may vary from as little as two seconds to as long as about 24 hours. The preferred reaction temperature is from about 200° F. to 400° F. and a longer time is required when the reaction occurs at lower temperatures. At about 300° F. to 350° F., which is a temperature easily reached in commercial equipment, 2 to 10 minutes are often sufficient to achieve complete reaction, although as pointed out previously, the rate of reaction will depend on other factors also. Heating at temperatures of 210°–240° F. in presence of steam is very effective for improving specific properties.

The following examples are merely illustrative of several embodiments of the invention, and are not to be construed as limiting the scope of the invention in any manner.

PREPARATION OF REAGENTS

EXAMPLE A

Beta-hydroxy glutaronitrile (NC—CH$_2$CHCH$_2$CN)
$\qquad\qquad\qquad\qquad\qquad\qquad\quad |$
$\qquad\qquad\qquad\qquad\qquad\qquad\;\;$OH This reagent was prepared by a modification of the method described in Bull. Soc. Chim. France 33, 725 (1923). A saturated aqueous solution of 292 g. (4.49 M) of KCN was added dropwise over a period of two hours at 60–75° C. to 322.5 g. (2.5 M) of 1,3-dichloropropanol-2. The reaction was slightly exothermic. At the end of the addition, the pH of the reaction mixture was 8.9, and it was adjusted to 6.5–7.0 by adding 20% aqueous HCl.

After filtration, the filtrate was extracted with ten 50 ml. portions of ethyl acetate. The combined ethyl acetate extracts contained only traces of free chloride ion. The organic extracts were then dried over anhydrous Na2SO4, filtered, and the solvent was removed under reduced pressure. The weight of the residue was 180.5 g. This was distilled. After removing a forerun, the product was distilled at 140–146° C. at 0.2 mm.: 98.5 g. of beta-hydroxy glutaronitrile were obtained (yield 36%). N content: 24.24% (calcd.: 25.4%). The product was soluble in water and common organic solvents.

EXAMPLE B

Beta-methoxy-glutaronitrile (NC—CH$_2$CH—CH$_2$CN)
$\qquad\qquad\qquad\qquad\qquad\qquad\qquad\quad |$
$\qquad\qquad\qquad\qquad\qquad\qquad\qquad$OCH$_3$ 40.0 g. (0.315 M) of dimethyl sulfate and 12.0 g. (0.3M) of NaOH dissolved in 20 ml. water were simultaneously added dropwise to 33.0 g. (0.3 M) of beta-hydroxy-glutaronitrile (produce of Example A). The reaction was exothermic and the temperature was maintained between 13–17° C. during the addition by means of a cooling bath.

The reaction mixture was allowed to warm up to room temperature, and extracted with ethyl acetate. The aqueous layer was treated again with 40.0 g. (0.315 M) of dimethyl sulfate (no additional NaOH was added) and extracted again with ethyl acetate.

The combined ethyl acetate extracts were dried over anhydrous Na$_2$SO$_4$. After filtration, the solvent was removed under reduced pressure and the residue was then distilled. After removal of a forerun, the main fraction was distilled at 123–128° C. at 0.6 mm. Weight 20.9 g. Yield: 56%. N: 21.1% (calcd.: 22.5%), OCH$_3$: 34.38 (calcd. 24.9%).

EXAMPLE C

Beta-methoxy-adiponitrile (NC—CH$_2$—CH$_2$CH—CH$_2$—CN)
$\qquad\qquad\qquad\qquad\qquad\qquad\qquad\qquad\quad |$
$\qquad\qquad\qquad\qquad\qquad\qquad\qquad\qquad$OCH$_3$ 44.4 g. (0.417 M) of 1,4-dicyano-butene-2 and 1.0 g. of metallic sodium were dissolved in 300 ml. of methanol. After 7 hours reaction at the reflux temperature, the reaction mixture was neutralized with glacial acetic acid, filtered, and the filtrate was stripped under reduced pressure. The residue was distilled. B.P.: 136–140° C. at 1.1 mm. (lit. B.P. 109–123° C. at 0.3–1.2 mm. and also 118–120° C. at 1.0 mm.). $N_D^{25}$=1.444 (lit. $N_D^{25}$=1.4451). Weight of product 41.6 g. Yield 72.0%. References: U.S.P. 2,500,942; Chem. Abstr. 45, 9464c (1951).

EXAMPLE D

N,N-methylene-bis-(methoxy-propionamide)
(CH$_3$O-CH$_2$CH$_2$—CONH)$_2$CH$_2$ 308 g. (2 M) of N,N-methylene-bis-acrylamide dissolved in 300 ml. of methanol at 45–50° C. were added dropwise over a period of two hours to 150 g. of 25% methanolic solution of sodium methoxide at 45–50° C. The addition required two hours. After 16 hours reaction time at 45–50° C. with stirring, 100% conversion (calculated from the disappearance of the vinyl groups in the reaction mixture) was achieved. The reaction mixture neutralized with glacial acetic acid. On cooling, the N,N methylene-bis-(methoxy-propionamide) crystallized out in shiny white crystals. Weight of crystalline precipitate: 408.5 g. Yield: 93.5%. The compound obtained was very soluble in cold water. N content: 13.1% (calcd.: 12.85%); OCH$_3$ content: 25.35% (calcd. 28.4%). M.P. 150–151° C.

EXAMPLE E

Methoxy-propionamido-methyl-acrylamide
(CH$_3$OCH$_2$CH$_2$CONHCH$_2$NHCH=CH$_2$)

42.1 g. of a 60% aqueous solution of N-methylolacrylamide (0.25 M) were added dropwise at room temperature to 51.5 g. (0.5 M) of methoxy-propionamide (prepared by reacting acrylamide with an excess of methanol in the presence of sodium methoxide catalyst) and 14.0 g. of 37% HCl dissolved in 50.0 ml. of water. The reaction mixture was allowed to stand overnight. The pH of the reaction mixture was adjusted to 6.0 by adding aqueous NaOH solution. After chilling, a white precipitate crystallized out. It was recrystallized from isopropanol. M.P.: 155–157° C. N content: 15.22% (calcd.: 15.05%). OCH$_3$ content: 17.01% (calcd. 16.65%). Vinyl content: 13.65% (calcd. 14.55%).

EXAMPLE F 1,3,5-tris-(beta-methoxy-propionyl)-hexahydro-s-triazine 30.0 g. (0.33 M) of trioxane dissolved in 42.5 g. (0.5 M) of freshly distilled beta-methoxy-propionitrile were added dropwise at 90–115° C. with stirring to a mixture of 42.5 g. (0.5 M) of freshly distilled beta-methoxy-propionitrile and 2.4 g. concentrated H$_2$SO$_4$. The reaction was exothermic and the temperature increased to 130° C. After the addition was completed, 93.9% conversion (calculated from the decrease in the formaldehyde content of the reaction mixture) was achieved. 100 ml. of methanol were added to the reaction mixture which was then neutralized with sodium methoxide, filtered and stripped under reduced pressure. The residue was added to 300 ml. of methyl-ethyl-ketone. After chilling, a white crystalline precipitate was obtained. N content: 12.46% (calcd. 12.2%). OCH$_3$ content: 26.78 (calcd. 26.95%). The product obtained was very soluble in water and polar solvents and insoluble in petrol ether, pentane and hexane. M.P.: 40°–41° C.

EXAMPLE G 1,4-dinitro-2,3-butanediol

Prepared by the procedure described in Izvest. Akad. Nauk S.S.R., Otdel. Khim. Nauk, 5, 944–45 (1960).

A solution of 280 ml. of nitromethane in 280 ml. of methanol was cooled to 5° C. and 58 ml. (0.4 mole) of 30% aqueous glyoxal and 32 g. (0.8 mole) of sodium hydroxide in 48 ml. of water were added simultaneously from two different addition funnels. The resulting mixture was stirred for 1 hour at 0° C. and then diluted with 200 ml. of water and saturated with an excess of sulfur dioxide. The organic phase was separated and the aqueous phase was extracted with four 80 ml. portions of nitromethane. The combined organic phases were decolorized with charcoal, dried over sodium sulfate and the nitromethane was stripped off in vacuo until crystallization of the residue occurred. An 8.4 g. yield of one of the diastereoisomers of 1,4-dinitro-2,3-butane diol, M.P. 134.0–134.5° was obtained. Additional crops of crystals, 14.3 g., M.P. 125–127°; 7.4 g., M.P. 95.0° and 21.7 g., M.P. 50–65° were obtained by concentrating the filtrate in vacuo. These are mixtures of the two diastereoisomers and the other isomer, M.P. 89.5–90°, could be isolated by recrystallization from a mixture of nitromethane and chloroform.

EXAMPLE H 1,4-bis-(beta methoxypropionyl) piperazine

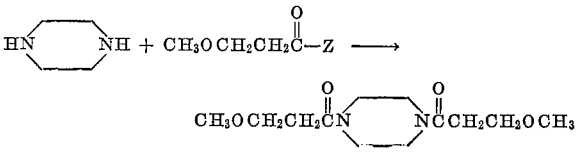

where —Z=—Cl or —OCH$_3$

*Method A:* (Z=Cl).—Beta methoxypropionyl chloride (54 parts) and hydroquinone (0.1 part) were dissolved in benzene (160 parts) and the solution chilled to 0° C. While the temperature was maintained at or below 0°, a solution of piperazine (17.2 parts) and triethylamine (40 parts) in chloroform (120 parts) was added in 20 minutes. The mixture was stirred at 0° for 30 minutes, and filtered to remove triethylamine hydrochloride (49 parts).

The filtrate was evaporated in vacuum to a volume of 180 parts, decolorized with carbon and treated with hexane (130 parts. The solution was chilled overnight, then filtered to give 1,4-bis-(beta methoxypropionyl) piperazine (30 parts, 58% yield) as colorless prisms, M.P. 74–76°. The compound is soluble in an equal weight of water.

A chloroform solution exhibited infrared absorption maxima at 6.13µ (amide carbonyl) 8.95µ )methoxyl).

*Method B:* (Z=OCH$_3$).—Methyl beta-methoxypropionate (532 parts) and piperazine (129 parts) were combined and heated during 8 hours at 60–140°, while methanol (76 parts) was collected by distillation. The mixture was placed under vacuum and excess ester (210 parts) removed by distillation, B.P. 54–56° at 16–19 mm., leaving the desired product as a residue (365 parts).

A portion of the residue (217 parts) was fractionally distilled and the fraction (102 parts) boiling at 190–195° at 0.4–0.5 mm. was collected. This fraction (26% yield) solidified to a soft solid, M.P. 47–51°, whose infrared absorption spectrum in chloroform solution showed it to be the same product as that produced by Method A; maxima were found at 6.13µ (amide carbonyl) and 8.95µ (methoxyl).

*Analysis.*—Calculated: C, 55.79%; H, 8.58%; N, 10.85%; methoxyl, 24.02%. Found: C, 56.09%; H, 8.97%; N, 11.98%; methoxyl, 20.03%.

EXAMPLE I

N,N'-Bis - (beta methoxypropionyl)-N,N'-dimethyl-1,2-ethylenediamine

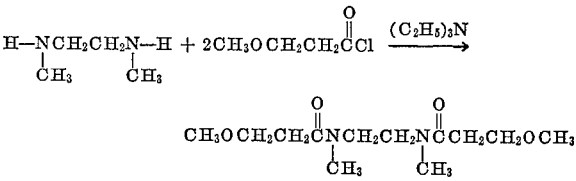

A solution of N,N'-dimethyl-1,2-ethylenediamine (88 parts) and triethylamine (202 parts) in chloroform (580 parts) was added at 0° to a chilled solution of beta methoxypropionyl chloride (270 parts) and hydroquinone (0.5 part) in benzene (770 parts). The reaction mixture was permitted to warm to room temperature and stand overnight.

Triethylamine hydrochloride (249 parts; expected weight 275 parts) was removed by filtration, and the solvents evaporated in vacuum to give crude N,N'-bis-(3-methoxypropionyl)-N,N'-dimethyl-1,2 - ethylenediamine (282 parts).

A portion of this crude material was distilled to give the pure product, B.P. 166–174° (0.3–0.5 mm.), in 59% yield.

*Analysis.*—Calculated: C, 55.35%; H, 9.29%; N, 10.76%; OCH$_3$, 23.84%. Found: C, 55.38%; H, 9.33%; N, 10.77%; OCH$_3$, 21.86%.

A chloroform solution exhibited infrared absorption maxima at 6.12 (amide carbonyl) and 8.95μ (methoxyl).

EXAMPLE J

Preparation of N,N'-bis-(beta methoxy-propionyl)-hexamethylene diamine 44.8 g. (0.2 mol) of N,N hexamethylene bisacrylamide were dissolved in 300 ml. methanol at the reflux temperature. Then 20 g. of a 25% methanolic solution of sodium methylate were added to this solution. After stirring for 4 hours at reflux temperature, 100% conversion (determined from the disapperance of the vinyl groups in the reaction mixture) was achieved. 5.6 g. of glacial acetic acid were added to neutralize the sodium methoxide and to adjust the pH of the reaction mixture to 6.0. By partially distilling off the methanol under reduced pressure until the precipitation of a crystalline product could be observed, the crude product could be isolated by filtration. It was dissolved in methylene chloride and the insoluble portion (mostly sodium acetate) was removed by filtration. By distilling off the solvent under reduced pressure, 26.0 g. (corresponding to 45.1% yield) of purified product were isolated. M.P.: 88–90° C. The product was soluble in water.

The IR spectrum of the compound obtained was consistent with the expected structure. Characteristic bands: 2.98μ: (NH); 603μ: (amide-carbonyl); 6.52μ: (amide II); 6.92μ: ($CH_2$); 7.25μ: ($CH_3$); 8.98μ: (ether).

EXAMPLE K

Preparation of 1,3,5-tris (beta hydroxy-propionyl) S-perhydro-triazine 83.0 g. (0.33 mol) of tris-acryloyl-S-perhydro triazine (TAT) were dissolved in 1500 ml. of water at 70–75° C. 1.0 g. of hydroquinone polymerization inhibitor was added to the solution. 25 ml. of 5 N NaOH were allowed to drip into the TAT solution over a period of 1 hour. During the addition of the alkali the temperature was maintained at 70–75° C. During the addition of the alkali the solution turned deep brown. After the addition of the alkali was completed, the reaction mixture was cooled to room temperature and then its pH was adjusted to 6.5 by adding concentrated HCl. The water was distilled off under reduced pressure and the residue was dissolved in 1000 ml. methanol. The methanolic solution was dried over anhydrous sodium sulfate and filtered. The solution was concentrated to 100 ml. by partially distilling off the methanol. The product was precipitated, by pouring the residual methanolic solution into 2000 ml. acetone. A slightly yellow, hygroscopic crystalline product was obtained and filtered. The weight of the product was 61.0 g., corresponding to 64.0% yield. The product was very soluble in water.

The IR spectrum of the product was consistent with the expected structure. Characteristic bands: 2.97μ: (OH); 6.12μ: (amide); 6.48μ: (amide II).

EXAMPLE L

Preparation of 1,3,5-tris (beta ethoxy-propionyl) S-perhydro-triazine 90 g. (1.0 mol) of trioxane were dissolved in 148.5 g. (1.5 mol) of beta-ethoxy-propionitrile. This solution was allowed to drip into a mixture of 148.5 g. (1.5 mol) of beta-ethoxy-propionitrile and 7.2 g. of concentrated sulfuric acid over a period of 50 minutes, at 75° C. The reaction was exothermic. The temperature was maintained at 75–80° C. by external cooling. After the addition was completed 93.5% conversion (determined from the formaldehyde content of the reaction mixture) was achieved. Then the reaction mixture was cooled to room temperature and neutralized with 27.0 ml. of 5 N NaOH solution. The crude reaction product was very soluble in water.

EXAMPLE M

Preparation of 1,3,5-tris (beta butoxy-propionyl) S-perhydro-triazine 30 g. (0.33 mol) of trioxane were dissolved in 63.5 g. (0.5 mol) of beta-butoxy-propionitrile. This solution was allowed to drip into a mixture of 63.5 g. (0.5 mol) of beta-butoxy-propionitrile and 2.4 g. of concentrated sulfuric acid at 70° C. over a period of 50 minutes. The reaction was exothermic. The temperature was maintained at 70–75° C. by external cooling. After the addition was completed, the reaction mixture was stirred for an additional hour at 70° C. 89.5% conversion (determined from the formaldehyde content of the reaction mixture) was achieved. The crude reaction product was insoluble in water and very soluble in ethylacetate.

EXAMPLE N

Preparation of bis (beta methoxypropionyl)-octodecylthio propionyl-S-perhydro-triazine 100 g. of a 25% methanolic solution of sodium methylate were added dropwise to a mixture of 83.0 g. (0.33 mol) of tris-acryloyl-S-perhydro triazine, 95.5 g. (0.33 mol) of octodecylmercaptan and 1000 ml. of methanol at 65° C. over a period of 1 hour. After the addition was completed, the reaction mixture was stirred for additional 10 hours at reflux temperature. The solid product which precipitated was isolated from the reaction mixture by filtration. It was washed several times with methanol. The weight of the product was 126 g., corresponding to 52.5% reaction yield. M.P.: 57–59° C. Sulfur content: 7.09% (calcd. 10.65%). The product was insoluble in water and methanol, but soluble in benzene.

REACTIONS WITH POLYMERS

EXAMPLE 1

Reaction of 1,3,5-tris-(beta-methoxy-propionyl) hexahydro-S-triazine (product of Example F) with cotton fabric.

Samples of bleached, desized cotton fabric (80 x 80 print cloth) were impregnated on a laboratory padder at 95% wet pickup with aqueous solutions containing:

A: 15% of the product of Example F+6.5% $KHCO_3$
B: 15% of the product of Example F+4.5% $K_2CO_3$
C: 15% of the product of Example F+1.3% NaOH
D: 10% of the product of Example F+4.3% $KHCO_3$
E: 10% of the product of Example F+4.3% $KHCO_3$ +2% $NaNO_2$ (polymerization inhibitor)
F: 5% of the product of Example F+2.2% $KHCO_3$ The samples were dried, cured for 6 minutes at 300° F. in a forced draft oven, neutralized and washed. The weight increase, reaction yield and physical properties obtained are shown in the following table.

TABLE III

| | Wt. gain | Reaction Yield, percent | Crease Recovery (degrees) | | Tensile Strength (lbs.) Warp | Tear Strength (lbs.) Warp |
| --- | --- | --- | --- | --- | --- | --- |
| | | | Dry | Wet | | |
| Sample: | | | | | | |
| A | 8.2 | 84 | 244 | 228 | 45 | 1.1 |
| B | 8.6 | 90 | 244 | 235 | 48 | 1.2 |
| C | 8.2 | 78 | 246 | 244 | 41 | 1.1 |
| D | 6.3 | 92 | 241 | 241 | 39 | 1.0 |
| E | 6.2 | 90 | 242 | 245 | 40 | 1.0 |
| F | 2.9 | 85 | 237 | 222 | 39 | 1.1 |
| Control | | | 172 | 140 | 65 | 1.9 |

It is apparent from the results set forth in Table III that the crosslinking reaction between cotton cellulose and 1,3,5-tris-(beta - methoxy - propionyl hexahydro-s-triazine has taken place with high efficiency. The resulting improvements in crease recovery have been achieved with only moderate losses in tensile and tear strength.

After many launderings of the treated fabrics the valuable properties of the treated fabrics were unchanged even when bleaching agents such as sodium hypochlorite were used in conjunction with the laundering process.

Furthermore, the treated fabrics of Example 1 were soft and had excellent appearance. By contrast, treatment of the cotton fabric with the unsaturated compound 1,3,5 tris acryloyl hexahydro-s-triazine, which is insoluble in water and common solvents, and has a tendency to polymerize, was difficult, and gave results which were erratic and could not be reproduced. Use of this unsaturated compound resulted in polymer deposition on the fiber and yarn surface, and yielded stiff fabrics of low crease recovery with significant impairment in tear strength.

Crease recovery of the treated fabrics of Example 1 was measured in accordance with the method described in the Technical Manual of the American Association of Textile Colorists, Volume 36, pages 165–167. Textile strength of the treated fabrics was measured in accordance with the Ravel Strip Method described in A.S.T.M. D–39–59, while tear strength was measured according to the Elmendorf method described in A.S.T.M. D–1424–59.

EXAMPLE 2

Samples of bleached desized cotton print cloth were padded with aqueous solutions containing beta-hydroxy glutaronitrile (product of Example A) and an alkaline catalyst, dried, cured in a forced draft oven and thoroughly washed. The weight increase due to the treatment was determined by weighing the fabric samples on an analytical balance before and after the reaction.

The following results were obtained

TABLE IV

| Impregnating Solution Used | Curing time and temperature, °F. | Wt. gain, percent |
| --- | --- | --- |
| Sample: | | |
| A___ 30% beta-hydroxy glutaro-nitrile plus 13% KHCO₃_____ | 5', 400 | 12.9 |
| B_____do_____ | 5', 350 | 8.6 |
| C___ 20% beta-hydroxy glutaro-nitrile plus 9% KHCO₃_____ | 5', 400 | 5.7 |
| D___ 30% beta-hydroxy glutaro-nitrile plus 11% CH₃COONa___ | 5', 500 | 4.5 |

The treated fabrics exhibited improved resistance to degradation by heat.

EXAMPLE 3

Samples of bleached desized cotton print cloth were padded with dimethyl formamide/water solutions containing 1,4 dinitro-2,3 butane diol (product of Example G) and potassium bicarbonate, dried, cured in a forced draft oven and thoroughly washed. The following results were obtained.

TABLE V

| Impregnating Solution Used | Curing time and temperature, °F. | Wt. gain, percent |
| --- | --- | --- |
| Sample: | | |
| A_____ 15% 1,4 dinitro 2,3 butane diol plus 8% KHCO₃_____ | 5', 300 | 2.4 |
| B_____do_____ | 5', 300 | 2.2 |
| C_____ 7.5% 1,4 dinitro 2,3 butane diol plus 4% KHCO₃____ | 5', 300 | 1.2 |
| D_____do_____ | 10', 300 | 1.1 |

The nitro group introduced into the fiber could be reduced and reacted with organic compounds to achieve further chemical modification.

EXAMPLE 4

The following example illustrates the reaction of activated beta-oxyethyl groupings chemically bound to cellulose. The experiment described can be represented by the following equations:

(A)

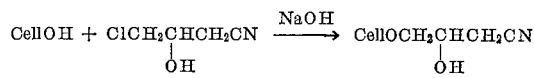

(B)

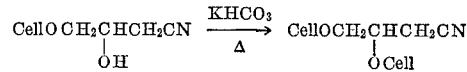

The experiment was carried out as follows. For the first step (A) a sample of cotton fabric was padded with a 15% solution of sodium hydroxide, and 4-chloro - 3-hydroxy butyronitrile was sprayed evenly with an atomizer. The fabric sample was allowed to stand wet in a smooth condition for 1 hour, neutralized and thoroughly washed to remove residual NaOH. A weight increase of 3.5% was obtained, and the nitrogen content of the sample corresponded well with the weight increase. For the second step (B), the treated fabric sample was padded with a 3% aqueous solution of potassium bicarbonate, dried, cured for 3 minutes at 400° F. and washed. After the curing step, the sample exhibited improved crease recovery, indicating that crosslinking had occured.

EXAMPLE 5

Samples of bleached, desized cotton fabric were treated with aqueous solutions containing N,N methylene bis-beta-methoxypropionamide (the product of Example E) and alkaline catalysts, dried, cured in a forced draft oven and thoroughly washed. The results obtained in the reactions were as follows:

TABLE VI

| Impregnating Solution Used | Curing time and temperature, °F. | Weight gain percent |
|---|---|---|
| Sample: | | |
| A............ 20% N,N methylene bis methoxy propionamide plus 9% KHCO₃...... | 10', 300 | 9.9 |
| B............ 20% N,N methylene bis methoxy propionamide plus 1.8% NaOH...... | 10', 300 | 5.8 |
| C............ 10% N,N methylene bis methoxy propionamide plus 4.6% KHCO₃.... | 10', 300 | 3.9 |
| D............ do | 10', 350 | 4.7 |
| E............ 10% N,N methylene bis methoxy propionamide plus 3.0% K₂CO₃..... | 10', 300 | 4.2 |
| F............ do | 10', 350 | 4.3 |

The wet and dry crease recovery of the samples treated in Example 5 were tested both initially and after 10 launderings in a home type washing machine at 140° F. with bleach, and found to be as follows:

TABLE VII

| | Crease Recovery Degrees (W+F) | | | |
|---|---|---|---|---|
| | Dry | | Wet | |
| | Initial | After 10L | Initial | After 10L |
| Sample: | | | | |
| A........... | | | 242 | 236 |
| B........... | 228 | 212 | 245 | 251 |
| C........... | 226 | 220 | 233 | 234 |
| D........... | 225 | 224 | 238 | 235 |
| E........... | 232 | 228 | 232 | 231 |
| F........... | 219 | 230 | 236 | 141 |
| Control..... | 162 | 171 | 140 | 141 |

It is apparent from the excellent improvement in crease recovery which persists through repeated launderings that a crosslinking reaction has taken place between the cotton cellulose and N,N methylene bis methoxy propionamide.

EXAMPLE 6

When rayon challis samples are treated according to the procedure described in Example 5, improved crease recovery is also achieved, and furthermore shrinkage in laundering is essentially eliminated: for example, an untreated control sample shrinks 16% in the warp direction when laundered 5 times at 140° F. Treated samples laundered simultaneously shrink only 2% in the warp direction.

EXAMPLE 7

Samples of rayon challis fabric were impregnated on a laboratory padder at 100% wet pickup with aqueous solutions containing the product of Example F and catalyst as follows:

TABLE VIII

A: 18% of the product of Example F+7.8% KHCO₃ +1.8% NaNO₂
B: 13% of the product of Example F+5.9% KHCO₃ +1.3% Na NO₂
C: 9% of the product of Example F+3.9% KHCO₃ +0.9% NaNO₂
D: 18% of the product of Example F+2.5% K₂CO₃
E: 13% of the product of Example F+1.8% K₂CO₃
F: 13% of the product of Example F+4.0% K₂CO₃
G: 9% of the product of Example F+2.7% K₂CO₃

The samples were dried, cured in a forced draft oven for 5 minutes at 325° F., neutralized and washed. The weight increases and improvements in physical properties obtained as a result of the treatment are shown in the following table:

TABLE IX

| | Percent Weight increase | Degrees (W+F) Crease Recovery | | Wash/ Wear Rating Tumble dried, 5L | Percent Shrinkage (warp) after 5L |
|---|---|---|---|---|---|
| | | Dry | Wet | | |
| A.......... | 5.0 | 227 | 245 | 4.3 | 2.5 |
| B.......... | 5.5 | 222 | 224 | 4.5 | 2.0 |
| C.......... | 4.0 | 221 | 205 | 4.5 | 3.0 |
| D.......... | 6.0 | 219 | 233 | 4.3 | 2.5 |
| E.......... | 4.8 | 246 | 203 | 4.3 | 3.5 |
| F.......... | 5.8 | 246 | 225 | 4.0 | 1.5 |
| G.......... | 4.5 | 258 | 224 | 4.0 | 1.0 |
| Control.... | | 206 | 152 | 1.0 | 19.0 |

No loss of crease recovery is noted after 10 launderings at 140° F. The nitrogen content of the treated fabrics is unchanged after laundering, and so is the initial low methoxyl content (0.4 to 0.6%). It is apparent from the data shown above that the treatment has improved crease recovery, wash/wear ratings and dimensional stability enormously. Furthermore, contrary to the results frequently obtained with known reagents on rayon, these improvements have been achieved with only moderate losses in abrasion resistance even without the addition of softener, without significant losses in tensile strength, and under suitable conditions with an actual gain in the wet strength properties of the fabric. The strength properties of the rayon samples prepared in accordance with Example 7 are shown in the following table:

TABLE X

| | Tensile Strength, lbs. | | Wet Tear Strength, lbs. | | Abrasion Resistance cycles | |
|---|---|---|---|---|---|---|
| | W | F | W | F | W (dry) | W (wet) |
| A........... | 43 | 57 | 1.3 | 1.6 | 700 | 160 |
| B........... | 42 | 59 | 1.3 | 1.6 | 850 | 130 |
| C........... | 53 | 71 | 2.0 | 2.7 | 950 | 280 |
| D........... | 43 | 56 | 1.8 | 2.5 | 700 | 170 |
| E........... | 49 | 70 | 2.0 | 2.5 | 1,000 | 300 |
| F........... | 43 | 56 | 1.6 | 1.9 | 500 | 160 |
| G........... | 48 | 62 | 2.1 | 2.8 | 1,000 | 260 |
| Control..... | 53 | 65 | 1.5 | 1.9 | 2,200 | 220 |

EXAMPLE 8

100 g. of 12% aqueous solution of medium viscosity, fully hydrolyzed polyvinyl alcohol were thoroughly mixed with a solution of 2.6 g. of N,N methylene bis methoxy propionamide (product of Example D) in 5 g. of water, and a solution of 1 g. of KHCO₃ in 4 g. of water was added. The amount of reagent used was thus 18%, based on the dry weight of polyvinyl alcohol. A very viscous solution was formed. A film was cast from this solution on a glass plate, dried at 160° F. and cured for 10 minutes at 300° F. in a forced draft oven. The cured polymer was scraped off the glass plate, broken up and washed several times with water to remove the alkaline catalyst. The reacted polymer was completely insoluble in cold water.

A control experiment was run by treating the fully hydrolized polyvinyl alcohol and KHCO₃ in identical manner without addition of the N,N methylene bis methoxypropionamide crosslinking agent: The polymer was cured for 10 minutes at 300° F. in presence of KHCO₃ in the control experiment, and the polymer remained entirely soluble in cold water.

EXAMPLE 9

The procedure of Example 8 was repeated, but 1,3,5 tri-(beta-methoxypropionyl) hexahydro-s-triazine (product of Example F) was used in place of N.N methylene bis methoxy propionamide. The polymer obtained by reaction with this trifunctional reagent was completely insoluble in water even at the boiling temperature of the polymer, indicating that complete insolubilization of the polyvinyl alcohol had taken place.

EXAMPLE 10

100 grams of a 24% aqueous solution of soluble starch (amylopectin—marketed under the trade name "Kosol" by the National Starch and Chemical Corp.) were thoroughly mixed with a solution of 4.3 g. of N,N- methylene bis methoxypropionamide (product of Example D) in 5 g. of water and a solution of 2.0 of KHCO₃ in 4.0 g. of water was then added. A film was cast from the solution so obtained, dried and cured for 10 minutes at 300° F. The modified starch obtained exhibited a reduced tendency to swell in water when compared to the soluble starch used for the preparation.

EXAMPLE 11

When the procedure of Example 10 was repeated, using 1, 3, 5 trimethoxy propionyl-hexahydro-s-triazine (product of Example F) in place of N,N methylene bis beta-methoxypropionamide, the modified starch obtained was completely insoluble in cold water, and did not dissolve in water, even at the boil. Complete insolubilization of the starch was achieved by the treatment.

EXAMPLE 12

100 grams of 14% aqueous solution of hydroxyethyl cellulose was mixed with a solution of 2.52 g. of 1,3,5 trimethoxypropionyl-hexahydro-s-triazine (product of Example F) in 5 g. of water and a solution of 1.16 g. of KHCO₃ in 4 g. of water was added. The viscous solution was poured onto a glass plate, dried at 160° F. and cured for 10 minutes at 300° F. The polymer was removed from the glass plate, broken up and washed with water. The modified cellulose obtained was completely insoluble in cold and in boiling water. In a control experiment, the procedure was repeated omitting the reagent. The unmodified polymer obtained in the control experiment was completely soluble in boiling water, and partially soluble even in cold water.

EXAMPLE 13

When hydroxyethyl cellulose was modified as outlined in Example 12, using N,N methylene bis methoxypropionamide, as the reagent, the modified polymer was insoluble in cold water.

EXAMPLE 14

A skein of yarn manufactured from unmodified polyvinyl alcohol fiber (non acetalized-non heat set experimental Vinylon yarn) was padded with an aqueous solution containing 21% N,N methylene bis methoxypropionamide (product of Example D) and 9.6% KHCO₃. The wet pickup was 52%, corresponding to an add-on of 10.9% reagent on the weight of dry yarn. The yarn was dried at 160° F. cured for 10 minutes at 300° F. and thoroughly washed. A weight increase of 5.3%, corresponding to a 69% reaction yield was obtained. The treated yarn was insoluble in boiling water while the untreated yarn swelled excessively and gradually disintegrated in water at 165°–175° F.

EXAMPLE 15

A skein of cotton yarn was padded with a 28% aqueous solution of 1,3,5-tri(beta-methoxypropionyl) hexahydro-s-triazine containing 12% KHCO₃. The wet pickup was 75%, and the add-on of reagent was 21% based on the dry weight of yarn. The cotton yarn was dried at 160° F., cured for 5 minutes at 325° F. in a forced draft oven, and thoroughly washed. A weight increase of 7.5% corresponding to a 50% reaction yield was obtained. The treated yarn had increased resilience and decreased elongation compared to untreated cotton yarn, indicating that the desired crosslinking reaction had taken place.

EXAMPLE 16

Reaction of N,N' bis beta methoxypropionyl piperazine (product of Example H) with cotton fabric Two samples of 80 x 80 cotton print cloth were treated on a laboratory padder at 90% wet pickup with an aqueous solution containing 15% of the product of Example H and 5.8% potassium bicarbonate. The samples were framed to original dimensions and dried in a forced draft oven. One sample (A) was then cured for 5 minutes at 325° F. and one sample (B) was steamed at approximately 220° F. for 30 minutes. After the heating step, the samples were washed and tested. The following results were obtained.

| | Weight Increase percent | Crease Recovery | |
|---|---|---|---|
| | | Dry | Wet |
| Sample: | | | |
| A | 4.25 | 194 | 209 |
| B | 4.20 | 181 | 219 |
| Control | | 162 | 140 |

EXAMPLE 17

Reaction of 1,3,5 tris (beta hydroxypropionyl) S-perhydrotriazine (product of Example K) with cotton fabric Two samples of 80 x 80 cotton print cloth were treated on a laboratory padder at 100% wet pickup with 7% aqueous solutions containing 3.5% KHCO₃ (sample A) and 0.8% KOH (sample B) respectively. The samples were framed to original dimensions, dried and cured in a forced draft oven for 3 minutes at 350° F. After the heating step, the samples were washed and tested. The following results were obtained:

| | Weight Increase percent | Reaction Yield | Crease Recovery | | Percent Shrinkage (warp) after 5L |
|---|---|---|---|---|---|
| | | | Dry | Wet | |
| Sample: | | | | | |
| A | 4.7 | 82 | 247 | 248 | 0.0 |
| B | 4.4 | 78 | 244 | 236 | 0.5 |
| Control | | | 167 | 142 | 8.5 |

EXAMPLE 18

Reaction of 1,3,5 tris beta ethoxypropionyl-S-perhydrotriazine (product of Example L) with cotton fabric A sample of 80 x 80 cotton print cloth was padded with an aqueous solution containing 10% of the product of Example L and 1% KOH. The sample was then steamed (without prior drying) for 30 minutes, and washed. The reaction yield as indicated by the weight increase was 60% of the theoretical. The shrinkage of the fabric was eliminated, and the crease recovery was increased to a value of 237° (wet) and 221° (dry). The fabric had excellent hand and appearance.

EXAMPLE 19

Reaction of bis beta methoxypropionyl-octadecylthio propionyl-S-perhydrotriazine (product of Example N) with cotton fabric A sample of 80 x 80 cotton print cloth was treated with a 6% solution of the product of Example N in benzene at 75% wet pickup and dried. It was then treated with a 1% aqueous solution of NaOH, dried, cured for 5 minutes at 325° F. and thoroughly washed. The fabric so treated exhibited excellent water repellency, improved crease recovery, improved tear strength and abrasion resistance.

EXAMPLE 20

A sample of mercerized bleached cotton broadcloth was padded with a solution containing 9% of the product of Example F (1,3,5 tris beta methoxypropionyl-S-perhydrotriazine), 2.7% potassium carbonate and 2% of a blue reactive dye having the structure:

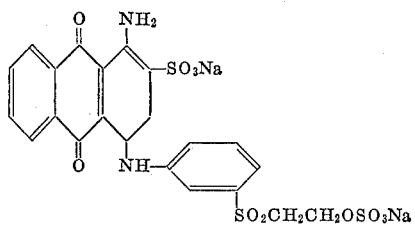

The treated sample was steamed for 10 minutes, then washed thoroughly to remove the unreacted portion of the dye, reactant and the catalyst. A dyed crease resistant fabric of excellent colorfastness was obtained.

An important feature of this invention is the discovery that polymeric materials containing active hydrogen atoms may be chemically modified and have desired properties imparted thereto by 1,3,5-tris-(beta-alkoxy-propionyl)-hexahydro-s-triazine; 1,3,5-tris-(beta-hydroxy-propionyl)-hexahydro-s-triazine; N,N-alkylene-bis(alkoxy-propionamide); and N,N-alkylene-bis-(hydroxy-propionamide). Methods for making specific compounds coming within the foregoing disclosure are set forth in Examples D, F and K and specific uses of these compounds are illustrated in Examples 1 and 5–15, inclusive. The alkoxy components of these compounds are preferably from 1 to 6 carbon atoms in length, and lengths of 1–4 carbons give excellent results.

In the foregoing discussion and examples, emphasis has been placed on the features of this invention which have particular usefulness for the treatment of textile structures which are wholly or in part of cellulosic materials. This term "cellulosic material" includes fibers, films, filaments, formed fabrics, woven, non-woven, felted, and other classified textile materials. However, it must be understood that the novel processes can be usefully employed with textile structures produced from other active hydrogen-containing polymeric materials. The treatment of non-cellulosic polymers according to the new processes of this invention can impart other desirable properties such as modified solubility, reduced tendency to swell in water, and the like and will find applicability in various industrial operations.

It is understood that various other modifications will be apparent to and can readily be made by those skilled in the art without departing from the scope and spirit of this invention. Accordingly, it is not intended that the scope of the claims appended hereto be limited to the description set forth herein but rather than the claims be construed as encompassing all the features of patentable novelty which reside in the present invention including all features which would be treated as equivalents thereof by those skilled in the art to which the invention pertains.

What is claimed is:

1. A process for the chemical modification of polymers containing hydroxyl groups selected from the group consisting of cellulosic materials, polyvinyl alcohol and starch comprising treating said polymers with a reagent consisting essentially of a compound selected from the group consisting of (a) 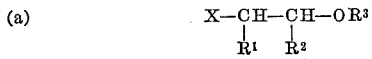

wherein:

$R^1$ and $R^3$ are selected from the group consisting of hydrogen and lower alkyl,
$R^2$ is a member selected from the group consisting of hydrogen, lower alkyl, chloro or cyano, substituted lower alkyl and X, and
X is selected from the group consisting of —CN, —CONH$_2$, CONHR$^4$R$^5$, —COR$^6$, —CHO, —NO$_2$, —CF$_3$ and —COOR$^7$; wherein $R^4$ and $R^5$ are members selected from the group consisting of hydrogen and lower alkyl, $R^6$ is lower alkyl and $R^7$ is lower alkyl;

(b) 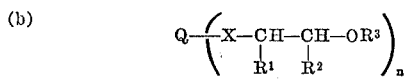

wherein:

$R^1$, $R^2$ and $R^3$ have the same meaning as above,
Q is a lower alkylene radical,
X is an electron-attracting group which stabilizes carbanions, and is linked to the remainder of the compound through a bond selected from the group consisting of carbon-carbon and carbon-nitrogen bonds, and
n is a whole number equal to the valence of Q and cyclic trimers thereof:

(c) 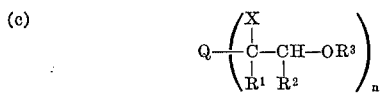

wherein:

Q, $R^1$, $F^2$, $R^3$ and X and $n$ have the same definition as in Formula (b) above; and

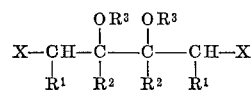

wherein:

$R^2$, $R^3$ and X have the same definition as in Formula (b) above, and
$R^1$ is a member selected from the group consisting of hydrogen, lower alkyl, and X; and heating said treated polymers in the presence of an alkaline catalyst to chemically modify said polymers.

2. A process for the chemical modification of polymers containing hydroxyl groups selected from the group consisting of cellulosic materials, polyvinyl alcohol and starch comprising treating said polymers with a reagent consisting essentially of a compound of the formula:

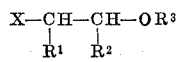

wherein $R^1$ and $R^3$ are members selected from the group consisting of hydrogen and lower alkyl, $R^2$ is a member selected from the group consisting of hydrogen, lower alkyl, chloro or cyano substituted lower alkyl, and X is a member selected from the group consisting of —CN, —CONH$_2$, —CONR$^4$R$^5$, —COR$^6$, —CHO, —NO$_2$, —CF$_3$ and —COOR$^7$, wherein $R^4$ and $R^5$ are members selected from the group consisting of hydrogen and lower alkyl, $R^6$ is lower alkyl and $R^7$ is a lower alkyl, and heating said treated polymers in the presence of an alkaline catalyst to chemicaly modify said polymers.

3. A process for chemically modifying cellulosic material comprising treating said cellulosic material with a reagent consisting essentially of a compound of the formula:

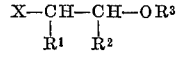

wherein $R^1$ and $R^3$ are members selected from the group consisting of hydrogen and lower alkyl, $R^2$ is a member selected from the group consisting of hydrogen, lower alkyl, chloro or cyano substituted lower alkyl, and X, and X is a member selected from the group consisting of —CN, —CONH$_2$, —CONR$^4$R$^5$, —COR$^6$, —CHO, —NO₂, —CF₃ and —COOR⁷, wherein R⁴ and R⁵ are members selected from the group consisting of hydrogen and lower alkyl, R⁶ is lower alkyl and R⁷ is a lower alkyl and heating said treated material in the presence of an alkaline catalyst to chemically modify said material.

4. A process for chemically modifying polymers containing hydroxyl groups selected from the group consisting of cellulosic materials, polyvinyl alcohol and starch comprising treating said polymers with a reagent consisting essentially of a compound of the formula:

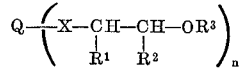

wherein:

Q is a lower alkylene radical,

R¹ and R³ are members selected from the group consisting of hydrogen and lower alkyl, R² is a member selected from the group consisting of hydrogen, lower alkyl, chloro or cyano substituted lower alkyl and X, X is an electron-attracting group which stabilizes carbanions and is linked to the remainder of said compound through a bond selected from the group consisting of carbon-carbon and carbon-nitrogen bonds, and n is a whole number equal to the valence of Q and cyclic trimers thereof; and heating said treated polymers in the presence of an alkaline catalyst to chemically modify said polymers.

5. The process as defined in claim 4 wherein X is an activating group selected from the group consisting of —CON<, —CF₂—

and —CONH—, and is linked through the carbon atom to the group

6. A process for chemically modifying cellulosic material comprising treating said material with a reagent consisting essentially of a compound of the formula:

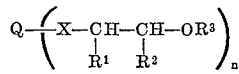

wherein:

Q is a lower alkylene radical,

R¹ and R³ are members selected from the group consisting of hydrogen and lower alkyl, R² is a member selected from the group consisting of hydrogen, lower alkyl, chloro or cyano, substituted lower alkyl, and X, X is an electron-attracting group which stabilizes carbanions, and is linked to the remainder of said compound through a bond selected from the group consisting of carbon-carbon and carbon-nitrogen bonds, and n is a whole number equal to the valence of Q and cyclic trimers thereof; and heating said treated material in the presence of an alkaline catalyst to chemically modify said material.

7. A process for chemically modifying polymers containing hydroxyl groups selected from the group consisting of cellulosic materials, polyvinyl alcohol and starch comprising treating said polymers with a compound of the formula:

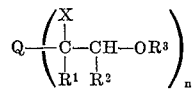

wherein:

Q is a lower alkylene radical,

R¹ and R³ are members selected from the group consisting of hydrogen and lower alkyl, R² is a member selected from the group consisting of hydrogen, lower alkyl, chloro or cyano substituted lower alkyl, and X, X is an electron-attracting group which stabilizes carbanions, and is linked to the remainder of said compound through a bond selected from the group consisting of carbon-carbon and carbon-nitrogen bonds; and n is a whole number equal to the valence of Q; and heating said treated polymers in the presence of an alkaline catalyst to chemically modify said polymers.

8. The process as defined in claim 7 wherein X is an activating group selected from the group consisting of —CN, —CONH₂, —CONR⁴R⁵, —COR⁶, —CHO, —NO₂, —CF³ and —COCR⁷, wherein R⁴ and R⁵ are members selected from the group consisting of hydrogen and lower alkyl, R⁶ is lower alkyl and R⁷ is a lower alkyl.

9. A process for chemically modifying cellulosic material comprising treating said material with a compound of the formula:

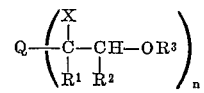

wherein:

Q is a lower alkylene radical,

R¹ and R³ are members selected from the group consisting of hydrogen and lower alkyl, R² is a member selected from the group consisting of hydrogen, lower alkyl, chloro or cyano substituted lower alkyl, and X, X is an electron-attracting group which stabilizes carbanions, and is linked to the remainder of said compound through a bond selected from the group consisting of carbon-carbon and carbon-nitrogen bonds; and n is a whole number equal to the valence of Q; and heating treated material in the presence of an alkaline catalyst to chemically modify said material.

10. A process for chemically modifying polymers containing hydroxyl groups selected from the group consisting of cellulosic materials, polyvinyl alcohol and starch comprising treating said polymers with a compound of the formula:

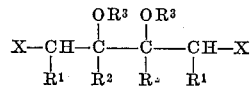

wherein:

R¹ is a member selected from the group consisting of hydrogen, lower alkyl, and X, R² is a member selected from the group consisting of hydrogen, lower alkyl, chloro or cyano substituted lower alkyl and X, R³ is a member selected from the group consisting of hydrogen and lower alkyl, and X is an electron-attracting group which stabilizes carbanions, and is linked to the remainder of said compound through a bond selected from the group consisting of carbon-carbon and carbon-nitrogen bonds; and heating said treated polymers in the presence of an alkaline catalyst to chemically modify said polymers.

11. A process for chemically modifying cellulosic material comprising treating said material with a compound of the formula:

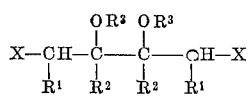

wherein:
R¹ is a member selected from the group consisting of hydrogen, lower alkyl, and X,
R² is a member selected from the group consisting of hydrogen, lower alkyl, chloro or cyano substituted lower alkyl and X,
R³ is a member selected from the group consisting of hydrogen and lower alkyl, and
X is an electron-attracting group which stabilizes carbanions, and is linked to the remainder of said compound through a bond selected from the group consisting of carbon-carbon and carbon-nitrogen bonds; and heating said treated material in the presence of an alkaline catalyst to chemically modify said material.

12. The process as defined in claim 1 wherein said polymers are cellulosic.

13. A process for chemically modifying polymers containing hydroxyl groups selected from the group consisting of cellulosic materials, polyvinyl alcohol and starch comprising treating said polymers with a member selected from the group consisting of 1,3,5-tris-(beta-alkoxy-propionyl)-hexahydro-a-triazine and 1,3,5-tris-(beta-hydroxy-propionyl)-hexahydro-a-triazine and heating said treated polymers in the presence of an alkaline catalyst to chemically modify said polymers.

14. A process for improving the wet and dry crease recovery properties of a textile containing cellulosic fibers comprising treating said textile with a member selected from the group consisting of 1,3,5-tris-(beta-alkoxy-propionyl)-hexahydro-s-triazine and 1,3,5-tris-(beta-hydroxy-propionyl)-hexahydro-s-triazine; and heating said treated textile in the presence of an alkaline catalyst to improve the wet and dry crease recovery properties of said textile.

15. A process for improving the wet and dry crease recovery properties of a cellulosic textile comprising treating said textile with 1,3,5-tris-(beta-methoxy-propionyl)-hexahydro-s-triazine, and heating said treated textile in the presence of an alkaline catalyst to improve the wet and dry crease recovery properties of said textile.

16. A process for chemically modifying polymers containing hydroxyl groups selected from the group consisting of cellulosic materials, polyvinyl alcohol and starch comprising treating said polymers with a reagent consisting essentially of a member selected from the group consisting of N,N-alkylene-bis(alkoxy-propionamide) and N,N-alkylene-bis(hydroxy-propionamide), and heating said treated polymers in the presence of an alkaline catalyst to chemically modify said polymers.

17. A process for improving the wet and dry crease recovery properties of a textile containing cellulosic fibers comprising treating said textile with a reagent consisting essentially of a member selected from the group consisting of N,N-alkylene-bis(alkoxy-propionamide) and N,N-alkylene-bis(hydroxy-propionamide), and heating said treated textile in the presence of an alkaline catalyst to improve the wet and dry crease recovery properties of said textile.

18. The process for improving the wet and dry crease recovery properties of a cellulosic textile comprising treating said textile with a reagent consisting essentially of N,N-methylene-bis(methoxy-propionamide), and heating said treated textile in the presence of an alkaline catalyst to improve the wet and dry crease recovery properties of said textile.

19. A process for insolubilizing polyvinyl alcohol comprising treating said polyvinyl alcohol with N,N-methylene-bis-(methoxy-propionamide), and heating said treated alcohol in the presence of an alkaline catalyst to modify the solubility properties of said alcohol.

20. A process for insolubilizing polyvinyl alcohol comprising treating said polyvinyl alcohol with 1,3,5-tris-(beta-methoxy-propionyl) hexahydro-s-triazine, and heating said treated alcohol in the presence of an alkaline catalyst to modify the solubility properties of said alcohol.

21. A process for insolubilizing hydroxyethyl cellulose comprising treating said cellulose with 1,3,5-tris-(beta-methoxy-propionyl) hexahydro-s-triazine, and heating said treated cellulose in the presence of an alkaline catalyst to modify the solubility properties of said cellulose.

22. A process for insolubilizing hydroxyethyl cellulose comprising treating said cellulose with N,N-methylene-bis-(methoxy propionamide), and heating said treated cellulose in the presence of an alkaline catalyst to modify the solubility properties of said cellulose.

23. A process for modifying starch to reduce the tendency to swell in water comprising treating said starch with N,N-methylene-bis-(methoxy-propionamide), and heating said treated starch in the presence of an alkaline catalyst to reduce the tendency of said starch to swell in water.

24. A process for modifying starch to reduce the tendency to swell in water comprising treating said starch with 1,3,5-tris-(beta-methoxy-propionyl) hexahydro-s-triazine, and heating said treated starch in the presence of an alkalaline catalyst to reduce the tendency of said starch to swell in water.

25. The product obtained by the process defined in claim 16.

References Cited

UNITED STATES PATENTS

| | | | |
|---|---|---|---|
| 2,524,399 | 10/1950 | Schoene et al. | 8—116 |
| 2,524,400 | 10/1950 | Schoene et al. | 8—116 X |
| 3,000,762 | 9/1961 | Tesoro | 8—120 X |
| 3,016,281 | 1/1962 | Kropa et al. | 8—116.2 |
| 3,031,435 | 4/1962 | Tesoro | 8—116 X |
| 3,109,695 | 11/1963 | Gardon | 8—120 X |
| 3,178,250 | 4/1965 | Ellis et al. | 8—120 X |
| 3,218,118 | 11/1965 | Steele et al. | 8—116 |
| 3,222,119 | 12/1965 | Tashlick et al. | 8—120 X |
| 3,230,031 | 1/1966 | Welch | 8—120 |

OTHER REFERENCES

Frick et al., Textile Research Journal, vol. 27, pp. 92–99 (1957) 8–120.

Borghetty et al., American Dyestuff Reporter, pp. 34–37, Feb. 4, 1963.

NORMAN G. TORCHIN, Primary Examiner

J. CANNON, Assistant Examiner

U.S. Cl. X.R.

8—17, 120, 127.6, 128; 260—91.3, 209, 231, 233.3

UNITED STATES PATENT OFFICE
CERTIFICATE OF CORRECTION

Patent No. 3,477,802      Dated November 11, 1969

Inventor(s) Giuliana C. Tesoro

CONTINUED...

Column 21, line 8, "-S-perhydro-" should read
-- -s-perhydro- --; line 58, "than" should read --that--.
Column 22, line 4, delete the comma (,) after "cyano";
line 7, "CONHR$^4$R$^5$" should read -- -CONHR$^4$R$^5$ --; line 30,
"F$^2$" should read --R$^2$--; line 33, insert --(d)-- before
the formula.
Column 23, line 34, insert a comma (,) after "-CF$_2$-";
line 55, delete the comma (,) after "cyano".
Column 24, line 20, "-COCR$^7$" should read -- -COOR$^7$ --.
Column 25, line 5, the right hand portion of the
formula: "-CH - X" should read  -CH - X ;
              |                      |
              R$^1$                   R$^1$ line 31, "hexahydro-a-triazine" should read
-- -hexahydro-s-triazine --; line 32, "hexahydro-a-triazine" should read -- -hexahydro-s-triazine --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents